(12) United States Patent
Ke

(10) Patent No.: US 12,612,318 B2
(45) Date of Patent: Apr. 28, 2026

(54) MULTI-STAGE CIRCULATING SEPARATION EQUIPMENT

(71) Applicant: Shih-Yuan Ke, Hsin-gang Shiang (TW)

(72) Inventor: Shih-Yuan Ke, Hsin-gang Shiang (TW)

( * ) Notice: Subject to any disclaimer, the term of this patent is extended or adjusted under 35 U.S.C. 154(b) by 569 days.

(21) Appl. No.: 18/097,996

(22) Filed: Jan. 17, 2023

(65) Prior Publication Data

US 2024/0140832 A1 May 2, 2024

(30) Foreign Application Priority Data

Oct. 28, 2022 (TW) .................................. 111141213

(51) Int. Cl.
*C02F 1/38* (2023.01)
*C02F 9/00* (2023.01)
(52) U.S. Cl.
CPC .................. *C02F 1/38* (2013.01); *C02F 9/00* (2013.01); *C02F 2201/005* (2013.01); *C02F 2301/026* (2013.01); *C02F 2303/06* (2013.01)
(58) Field of Classification Search
CPC ............ B01D 21/0006; B01D 21/0012; B01D 21/267; B01D 36/00; B01D 21/24; B01D 17/02; B04C 11/00; B04C 5/04; B04C 5/26; B04C 5/28; B04C 9/00; B04C 2009/002; B04C 5/00; B04C 5/12; B04C 3/00; C02F 1/38; C02F 11/00; C02F 9/00; C02F 2201/005; C02F 2301/026; C02F 2303/06; C02F 1/00; C02F 1/40; C10G 1/00; C10G 2300/1003
USPC ........................................................ 210/787
See application file for complete search history.

(56) References Cited

U.S. PATENT DOCUMENTS 6,079,571 A * 6/2000 Stowell .............. B01D 17/0211
210/DIG. 5
6,582,600 B1 * 6/2003 Hashmi ..................... B04C 5/26
209/729
6,790,346 B2 * 9/2004 Caleffi ...................... B04C 5/30
210/194

(Continued)

FOREIGN PATENT DOCUMENTS

EP 0005651 A1 * 11/1979 ............. C08B 30/00
TW 107126568 A 7/2018

*Primary Examiner* — Bobby Ramdhanie
*Assistant Examiner* — William Addison Geisbert
(74) *Attorney, Agent, or Firm* — FRESH IP PLC; Clifford D. Hyra; Aubrey Y. Chen

(57) ABSTRACT

A multi-stage circulating separation equipment is used to solve the problem of poor effect of conventional separation of a mixture. The multi-stage circulating separation equipment comprises a tank, a plurality of cyclones, a plurality of pressurizing pumps, and a pipeline module. The tank includes an upstream end and a downstream end. The tank includes an interior divided by a plurality of partitioning boards into a crude liquid chamber and a plurality of treatment liquid chambers. The crude liquid chamber and the plurality of treatment liquid chambers are arranged from the upstream end towards the downstream end. Each of the plurality of cyclones includes at least one discharge port and at least one return port. The discharge ports of the plurality of cyclones intercommunicate with the plurality of treatment liquid chambers, respectively. The pipeline module is connected to the tank, the plurality of cyclones, and the plurality of pressurizing pumps.

9 Claims, 5 Drawing Sheets

(56)     References Cited

U.S. PATENT DOCUMENTS

2011/0146976 A1 *   6/2011   Hackworth ............ E21B 43/38
                                                         210/512.2

* cited by examiner

MULTI-STAGE CIRCULATING SEPARATION EQUIPMENT

FIELD

The present invention relates to a separation equipment and, more particularly, to a multi-stage circulating separation equipment using the difference in specific gravity to separate the substances in a mixture.

BACKGROUND

Taking an oil tank of an oil refinery as an example, since the oil tank is a sealed space, when the oxygen concentration is lower than 18% vol (the volume of oxygen in the air is lower than 18%), a worker in the oil tank will suffer from hypoxia, which may cause an accident, such as death. Therefore, it is necessary to adopt a machinery equipment without the need of sending workers into the oil tank to proceed with removal of oil sludge and cleaning the oil tanks, etc.

Please refer to FIG. 1 illustrating a conventional machinery equipment 9 for carrying out a method of removing oil sludge. The conventional machinery equipment 9 includes a crude oil tank 91, a to-be-treated oil tank 92, and a circulating temporary oil storage tank 93. The crude oil tank 91 receives heavy oil and light oil, and the light oil floats on the heavy oil. The crude oil tank 91 intercommunicates with the to-be-treated oil tank 92 via a delivery pipe 94a, the to-be-treated oil tank 92 intercommunicates with the circulating temporary oil storage tank 93 via a delivery pipe 94b, and the circulating temporary oil storage tank 93 intercommunicates with the crude oil tank 91 via a delivery pipe 94c, thereby substantially forming a loop.

Furthermore, a switch valve 95a and a first pump 96a are disposed on the delivery pipe 94a. Two switch valves 95b and 95c, an inspection valve 95d, and a second pump 96b are disposed on the delivery pipe 94c. The switch valve 95b and the second pump 96b are closer to the circulating temporary oil storage tank 93. The switch valve 95c is closer to the crude oil tank 91. Furthermore, the inspection valve 95d is located between the switch valve 95b and the switch valve 95c. A heater 97 and a non-return valve 95e are disposed on the delivery pipe 94a, and the non-return valve 95e is located between the heater 97 and the to-be-treated oil tank 92. Two ends of a delivery pipe 94d intercommunicates with the delivery pipe 94a, and the non-return valve 95e and the heater 97 are located between the two ends of the delivery pipe 94d. A switch valve 95f is disposed on the delivery pipe 94d. A non-return valve 95g is also disposed on the delivery pipe 94c and located between the switch valve 95c and the inspection valve 95d.

In use, the switch valves 95a, 95b and 95c are firstly opened, and the switch valve 95f is closed, such that the light oil at the upper portion of an interior of the crude oil tank 91 can be pumped out by the first pump 96a to serve as a laundry detergent carrier. The laundry detergent carrier flows through the delivery pipe 94a, the heater 97 and the non-return valve 95e and is heated to about 60° C. to dissolve the oil sludge in the to-be-treated oil tank 92 and to reduce the viscosity of the oil sludge, such that the oil sludge can be easily moved out of the to-be-treated oil tank 92 by the laundry detergent carrier. In an embodiment not requiring heating of the laundry detergent carrier, the switch valve 95f is opened, such that the laundry detergent carrier can bypass the heater 97 and flow through the delivery pipe 94d.

Furthermore, since a vacuum pump 96c is disposed on the circulating temporary oil storage tank 93, a negative pressure can be formed in the interior of the circulating temporary oil storage tank 93 by the vacuum pump 96c, such that the laundry detergent carrier and the oil sludge in the to-be-treated oil tank 92 can form a mixture (hereinafter "crude liquid") which flows through the delivery pipe 94b into the circulating temporary oil storage tank 93. Then, the crude liquid is pumped out by the second pump 96b, flows through the switch valve 95b, the non-return valve 95g, and the switch valve 95c, and flows into and is stored in the crude oil tank 91 for refinement.

After many times of repeated circulation, the inspection valve 95d can be used to confirm whether the oil sludge in the to-be-treated oil tank 92 is completely removed. Thus, not only the oil sludge in the to-be-treated oil tank 92 can be safely removed, the oil sludge, which is originally deemed as a waste and discarded, can be recycled and refined, which meets the concept of environmental protection while increasing the revenue, achieving several purposes at one stroke.

However, since the components, such as the delivery pipes and the pumps, of the above conventional machinery equipment 9 circulatingly deliver the crude liquid with suspended impurities over a long period of time, some components are apt to be damaged or malfunction. Furthermore, since the machinery equipment 9 uses the crude liquid containing suspended impurities as the carrier, the unclean quality will adversely affect the work period and the quality control. Furthermore, the machinery equipment 9 can only move the oil sludge in the to-be-treated oil tank 92 into the crude oil tank 91 (at best only move the oil sludge) but cannot proceed with separation of the oil and sludge. As a result, the amount of oil sludge will be increased but cannot be reduced, which is not ideal.

Taiwan Patent No. 1765079 discloses a method for treating bottom sludge in a crude oil tank. The method includes six independently operable steps: (1) an oil sludge pretreatment step: the oil sludge is pretreated by filtration and homogenization, wherein stout solid matters, such as large rocks, screws, iron plates, etc., are filtered first, and the oil sludge is delivered into a preheating chamber for preheating, such that the oil sludge is in a fluid state; (2) a cyclone three-phase separation step: after the oil sludge pretreatment step, high-temperature steam is used as a scrubbing agent, wherein the oil sludge is scrubbed and heated in a cyclone chamber of a cyclone three-phase separation machine to dissolve and suspend hydrocarbons, to vaporize wastewater, and to volatile petroleum gas, thereby separating oil, water, solid waste, and petroleum gas; (3) a petroleum gas oxidation and combustion step: a thermal oxidation device is used to extract and collect the petroleum gas produced from the cyclone three-phase separation machine, and the petroleum gas is oxidized and combusted through thermal oxidation by a thermal oxidation combustion device connected to propane gas; (4) a liquid catalyst extraction step: after the cyclone three-phase separation step separating oil from water, porous structures and high-viscosity hydrocarbons contained in the residing solid waste undergo a microbubble extraction step cooperating with a liquid catalyst, wherein an impingement method is used to enable microbubbles having a diameter as small as 20 microns (0.02 mm) carrying the liquid catalyst to infiltrate the pores in the solid waste, thereby extracting all hydrocarbons and oil contents residing on the surface of the porous solid waste and in the pores of the porous solid waste; (5) a liquid catalyst recycling step: including a two-stage molecule distillation technique to recycle the liquid catalyst for reuse in the liquid catalyst extraction step by circulating supply, and the separated and recycled crude oil is free of the liquid catalyst; and (6) a wastewater treatment step: after the cyclone three-phase separation step, the wastewater produced from the cyclone three-phase separation machine is treated, wherein the wastewater treatment step includes a precision oil/water separation step, an active carbon absorption step, and an anion/cation exchange step, which are used to remove all hydrocarbons residing in the wastewater, and the discharged water can be recycled and reused.

However, in the above method for treating bottom sludge in a crude oil tank, the cooperating equipment structures are complicated and expensive. Furthermore, the liquid catalyst is added to proceed with the extraction treatment, and the two-stage molecule distillation technique is used to recycle the liquid catalyst. Although the crude oil does not contain the liquid catalyst after separation and recycling, the operation cost is high. Therefore, the method is still not ideal.

SUMMARY

To solve the above problem, an objective of the present invention is to provide a multi-stage circulating separation equipment which, when applied in a cleaning operation in which no person enters an oil tank, can separate the solid matters from the oil sludge in the to-be-treated oil tank, thereby avoiding accumulation of the oil sludge.

Another objective of the present invention is to provide a multi-stage circulating separation equipment which uses a clarified liquid as a supplement of a laundry detergent carrier, such that the components and pipes are less likely to be damaged or malfunction due to long-term circulating delivery of the crude oil containing suspended impurities.

A further objective of the present invention is to provide a multi-stage circulating separation equipment which has a simple structure and easy to install while reducing the equipment costs.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "one" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "join", "assembly", or similar terms is used to include separation of connected members without destroying the members after connection or inseparable connection of the members after connection. A person having ordinary skill in the art would be able to select according to desired demands in the material or assembly of the members to be connected.

A multi-stage circulating separation equipment according to the present disclosure comprises a tank, a plurality of cyclones, a plurality of pressurizing pumps, and a pipeline module. The tank includes an upstream end and a downstream end. The tank includes an interior divided by a plurality of partitioning boards into a crude liquid chamber and a plurality of treatment liquid chambers. The crude liquid chamber and the plurality of treatment liquid chambers are arranged from the upstream end towards the downstream end. Each of the plurality of cyclones includes at least one discharge port and at least one return port. The discharge ports of the plurality of cyclones intercommunicate with the plurality of treatment liquid chambers, respectively. The pipeline module is connected to the tank, the plurality of cyclones, and the plurality of pressurizing pumps. A respective pressurizing pump closer to the upstream end pumps a fluid in the tank into an associated cyclone to urge a fluid with a relatively larger specific gravity to flow through the discharge port of the associated cyclone into an associated treatment liquid chamber. The fluid with the relatively larger specific gravity is pumped by a next pressurizing pump to a next cyclone, thereby successively delivering the fluid with the relatively larger specific gravity towards the downstream end. A fluid with a relatively smaller specific gravity flows through the return port of the associated cyclone towards the upstream end and into the tank for continuous circulation.

Based on the above, when applying the multi-stage circulating separation equipment according to the present disclosure in the cleaning operation in which no person enters the oil tank, since solid substances in the oil sludge in the to-be-treated oil tank can be separated, the solid substances in the oil sludge will not be carried back into the crude oil tank, avoiding accumulation of the oil sludge. Furthermore, since the multi-stage circulating separation equipment according to the present disclosure uses multi-stage separations in which the clean clarified liquid with a relatively smaller specific gravity is used as the supplement of the laundry detergent carrier, the pipeline module and the plurality of pressurizing pumps are less likely to be damaged or malfunction after long-term circulating delivery of the crude liquid with suspended impurities while avoiding adverse influence on the work period and poor quality control caused by the suspended impurities. Furthermore, the multi-stage circulating separation equipment according to the present disclosure has a simple structure which is helpful in reducing the equipment costs, and the volume is small while permitting continuous circulating treatment of a large amount of oil sludge, which is very ideal.

In an example, each partitioning board may include an overflow hole. The overflow hole of one of each two adjacent partitioning boards closer to the downstream end is higher than the overflow hole of another of the two adjacent portioning boards closer to the upstream end. Therefore, when the fluid level in a treatment liquid chamber closer to the downstream end is too high, the fluid can overflow to another treatment liquid chamber on the left side to avoid work safety accident resulting from overload of space. Furthermore, a treatment liquid chamber closer to the downstream end than another treatment liquid chamber can accumulate more fluid than the another treatment liquid member, increasing use safety and utility.

In an example, the plurality of treatment liquid chambers may include, from the upstream end towards the downstream end in sequence, a first treatment liquid chamber, a second treatment liquid chamber, a third treatment liquid chamber, and a fourth treatment liquid chamber. The plurality of cyclones may include a first cyclone whose discharge port is aligned with the second treatment liquid chamber, a second cyclone whose discharge port is aligned with the third treatment liquid chamber, and a third cyclone whose discharge port is aligned with the fourth treatment liquid chamber. Therefore, the fluid in the crude liquid chamber can successively undergo multi-stage cyclone separation treatment to increase the separation effect.

In an example, the pipeline module may include a feeding pipe intercommunicating with a connecting pipe and the crude liquid chamber. The pipeline module may further include a discharge pipe intercommunicating with the connecting pipe and the first treatment liquid chamber. Therefore, the crude liquid can be inputted into the tank by a simple structure, and the clarified liquid after treatment can be guided out of the tank, which reduces the costs, increases the assembling effect, and enhances maintenance convenience.

In an example, the return port of the first cyclone may be connected to a return pipe. A three-way valve may be disposed on the return pipe to control the return fluid to flow into the crude liquid chamber or the first treatment liquid chamber. Therefore, the return fluid can serve as a supplement of the laundry detergent carrier of the crude liquid chamber according to need.

In an example, the second cyclone may include two return ports. One of the two return ports may intercommunicate with the crude liquid chamber via a return pipe, and another of the two return ports may intercommunicate with the second treatment liquid chamber via another return pipe. Therefore, a portion of the clarified liquid separated from the second cyclone can serve as a supplement of the laundry detergent carrier of the crude liquid chamber, and another portion of the clarified liquid can serve as a supplement of the laundry detergent carrier of the second treatment liquid chamber.

In an example, the return port of the third cyclone may intercommunicate with the second treatment liquid chamber via a return pipe. Therefore, the clarified liquid separated from the third cyclone can serve as a supplement of the laundry detergent carrier of the second treatment liquid chamber.

In an example, the plurality of pressurizing pumps may include a first pressurizing pump intercommunicating with the crude liquid chamber via a suction pipe and intercommunicating with the first cyclone via a delivery pipe, a second pressurizing pump intercommunicating with the second treatment liquid chamber via another suction pipe and intercommunicating with the second cyclone via another delivery pipe, and a third pressurizing pump intercommunicating with the third treatment liquid chamber via a further suction pipe and intercommunicating with the third cyclone via a further delivery pipe. Therefore, the crude liquid can undergo three-stage cyclone separation treatment by a simple structure, which reduces the costs, increases the assembling effect, and enhances maintenance convenience.

In an example, the multi-stage circulating separation equipment may further comprise a solid-liquid separator. One of the pluralities of pressurizing pumps may intercommunicate with one of the plurality of treatment liquid chambers closest to the downstream end via a suction pipe, and the one of the plurality of pressurizing pumps may intercommunicate with the solid-liquid separator via a delivery pipe. Therefore, the solid matter can be separated from the crude liquid and is easy to remove, increasing the separation effect and the operational convenience.

In an example, the multi-stage circulating separation equipment may further comprise a liquid collecting tank. The solid-liquid separator may deliver a liquid obtained after solid-liquid separation into the liquid collecting tank via a liquid delivery pipe. The liquid collecting tank may intercommunicate with the third treatment liquid chamber via a return pipe. Therefore, the liquid separated from the solid-liquid separator can serve as a supplement of the laundry detergent carrier of one of the treatment liquid chambers, increasing the separation effect and reducing the operation costs.

DETAILED DESCRIPTION

Figure 1:
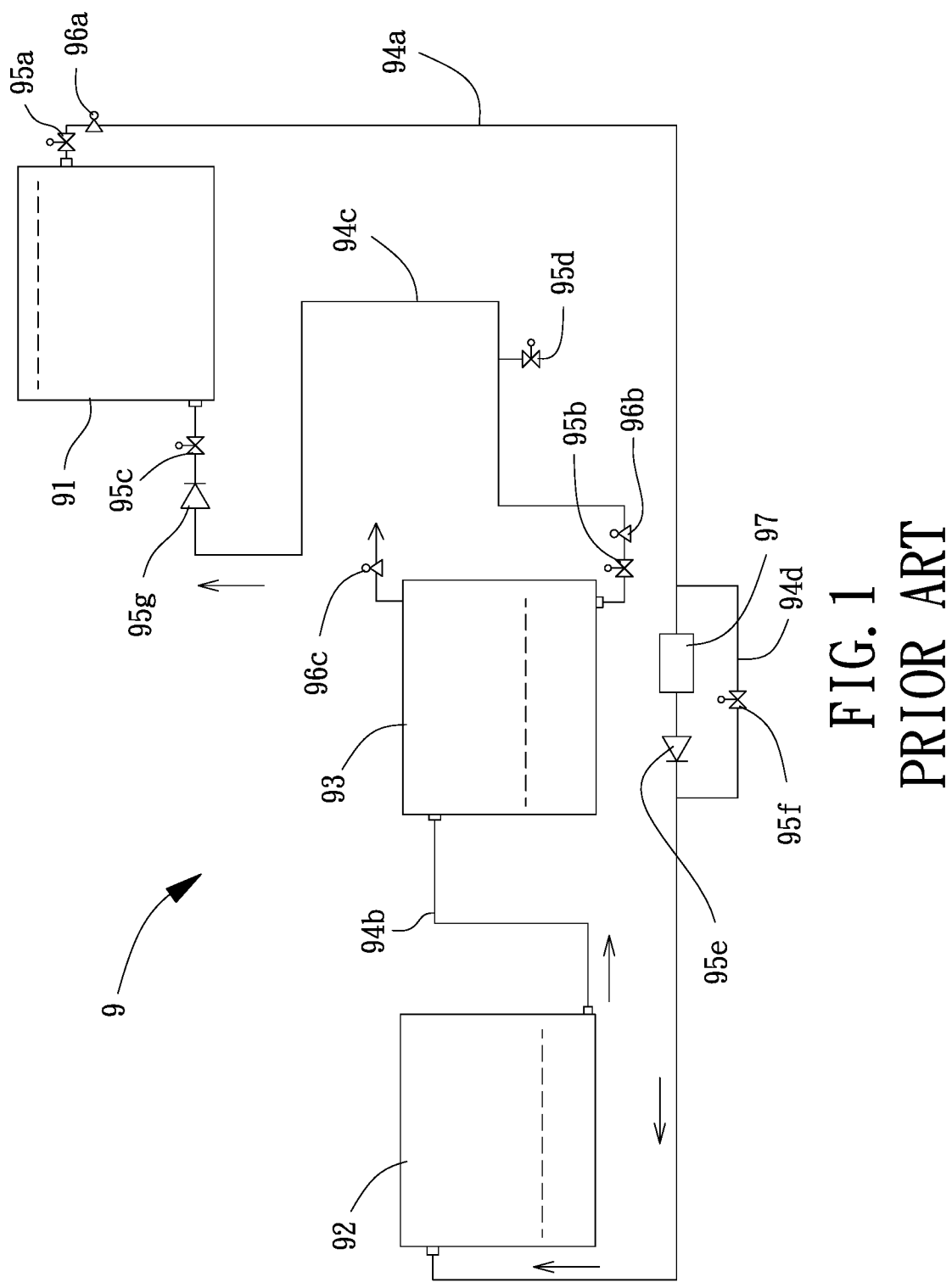
FIG. 1 is a diagram illustrating a conventional machinery equipment for carrying out a method of removing oil sludge.

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

A multi-stage circulating separation equipment according to the present disclosure can separate substances with a relatively larger specific gravity (heavier substances) from substances with a relatively smaller specific gravity (lighter substances) in a separable mixture. The principle used is that the substances with a relatively larger specific gravity in the mixture sink more easily than the substances with a relatively smaller specific gravity, and that the substances with a relatively smaller specific gravity will float on the substances with a relatively larger specific gravity, the to-be-treated mixture with different specific gravities undergoes a plurality of treatment stages. For example, oil sludge (a mixture of oil and sludge), mixtures containing precious metal, and chemicals containing impurities can undergo separation treatment using the multi-stage circulating separation equipment according to the present disclosure.

It is worth noting that, to clarify the structure and operation of embodiments of the present disclosure, an example of using the multi-stage circulating separation equipment according to the present disclosure to proceed cleaning of the oil sludge in an oil tank (no worker enters the oil tank to clean) to separate oil from sludge will be described. Nevertheless, cleaning oil tanks is not the only application of embodiments of the present disclosure. At least one embodiment may also be applied in separation treatments including separation treatment of precious metal from waste material recycling, mineral separation treatment of refining and concentrating valuable minerals from ores exploited from a mine ground, separation of impurities from a mixture in chemical refining for increasing the purity.

Figure 2:
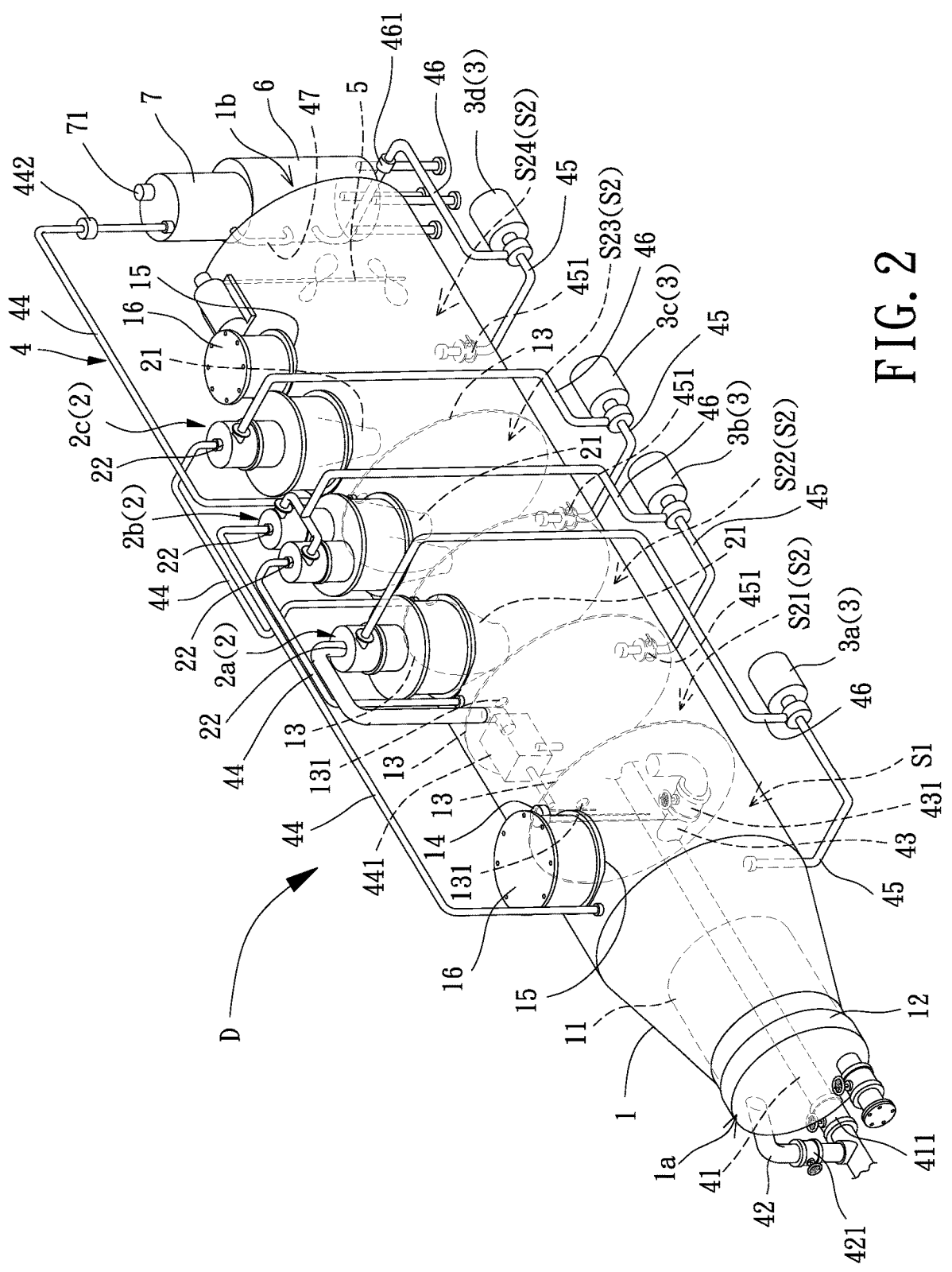
FIG. 2 is a perspective view of a multi-stage circulating separation equipment of at least one embodiment according to the present disclosure.
Figure 3:
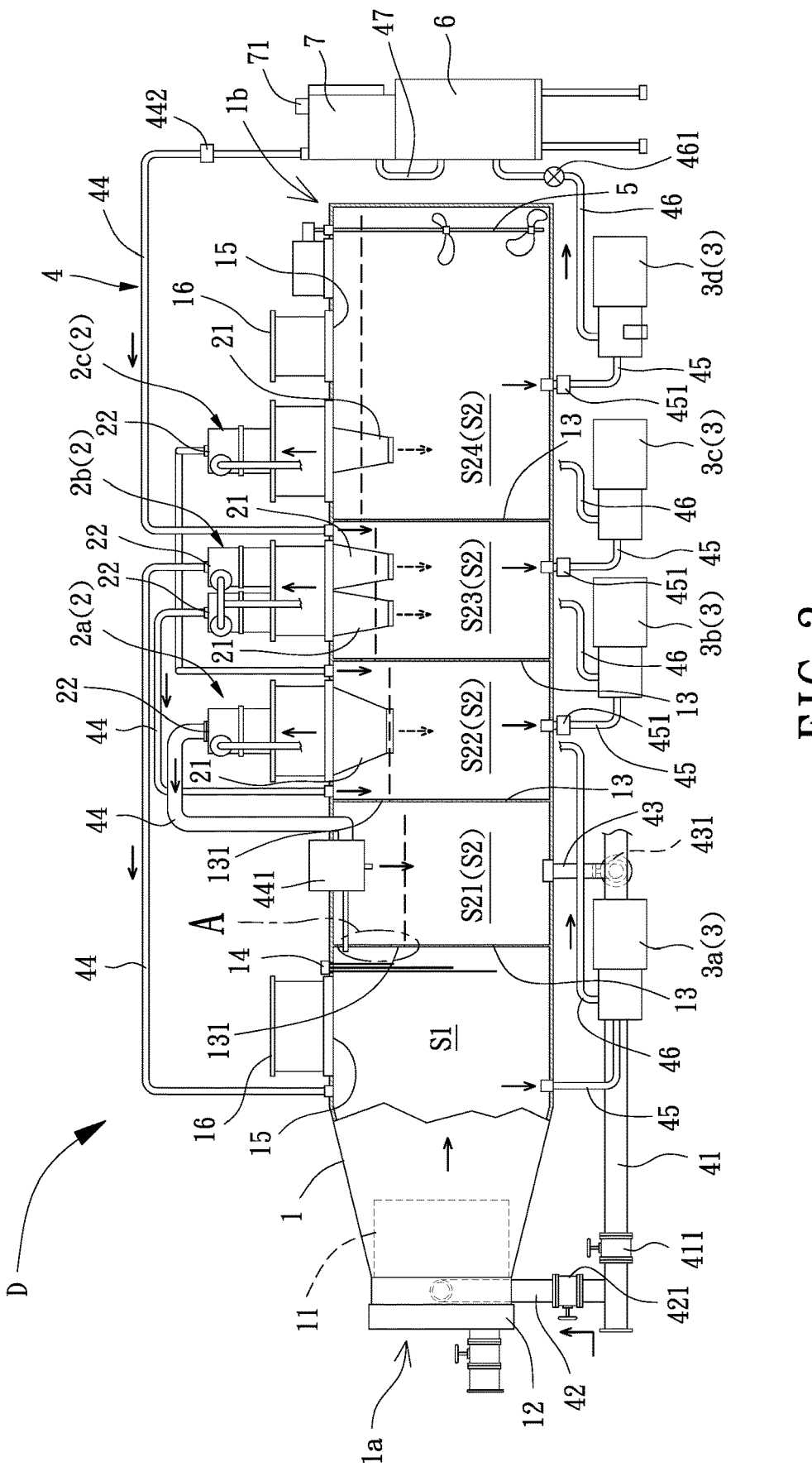
FIG. 3 is a side, cross sectional view of the multi-stage circulating separation equipment of at least one embodiment according to the present disclosure.

With reference to FIGS. 2 and 3, a multi-stage circulating separation equipment D of a preferred embodiment according to the present disclosure comprises a tank 1, a plurality of cyclones 2, a plurality of pressurizing pumps 3, and a pipeline module 4. The pipeline module 4 is connected to the tank 1, the plurality of cyclones 2, and the plurality of pressurizing pumps 3.

The tank 1 includes an upstream end 1a and a downstream end 1b. The tank 1 can include a filter 11 disposed on the upstream end 1a to filter impurities flowing into the tank 1, avoiding damage. To permit easy cleaning of the filter 11, the tank 1 may include a cleaning opening 12.

An interior of the tank 1 is divided by a plurality of partitioning boards 13 into a crude liquid chamber S1 and a plurality of treatment liquid chambers S2. The crude liquid chamber S1 is closest to the upstream end 1a. The crude liquid chamber S1 and the plurality of treatment liquid chambers S2 are arranged from the upstream end 1a towards the downstream end 1b. In this embodiment, the number of the plurality of treatment liquid chambers S2 may be, but not limited to, four. Furthermore, for ease of explanation, the four treatment liquid chambers S2 are called first treatment liquid chamber S21, second treatment liquid chamber S22, third treatment liquid chamber S23, and fourth treatment liquid chamber S24 from the upstream end 1a towards the downstream end 1b (from left to right in the direction according to FIG. 3) in sequence. Namely, the first treatment liquid chamber S21 is the treatment liquid chamber S2 closest to the crude liquid chamber S1, the second treatment liquid chamber S22 is the second one from the upstream end 1a, the third treatment liquid chamber S23 is the third one from the upstream end 1a, and the fourth treatment liquid chamber S24 is the treatment liquid chamber S2 closest to the downstream end 1b.

Figure 4:
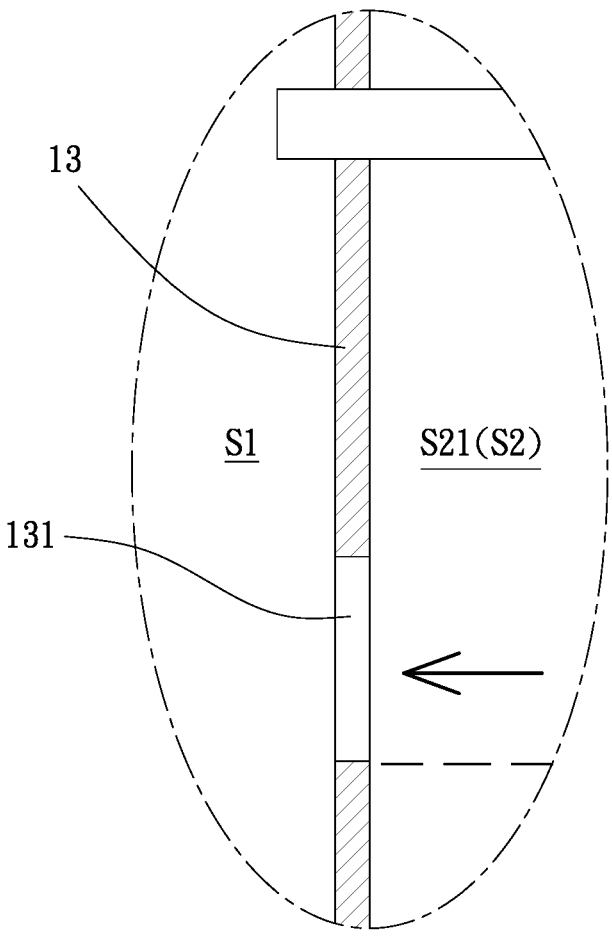
FIG. 4 is an enlarged view of a circled portion A of FIG. 3.

With reference to FIGS. 3 and 4, each partitioning board 13 may include an overflow hole 131. The overflow hole 131 of one of each two adjacent partitioning boards 13 closer to the downstream end 1b is preferably higher than the overflow hole 13 of another of the two adjacent portioning boards 13 closer to the upstream end 1a. Thus, when a level of a fluid in a treatment liquid chamber S2 closer to the downstream end 1b is too high, the fluid can overflow to another treatment liquid chamber S2 at the left side (according to the direction of FIG. 3) to avoid work safety accident resulting from overload of space. A treatment liquid chamber closer to the downstream end than another treatment liquid chamber can accumulate more fluid than the another treatment liquid member. Furthermore, the tank 1 may further include a sensor 14. The sensor 14 is in electrical connection with a controller and can be used to detect the liquid level of the crude liquid chamber S1.

Furthermore, still referring to FIGS. 2 and 3, the pipeline module 4 includes a connecting pipe 41 and a feeding pipe 42 intercommunicating with the connecting pipe 41 and the crude liquid chamber S1. The connecting pipe 41 includes a switch valve 411 for controlling the fluid from an input end of the connecting pipe 41 to flow towards an output end of the connecting pipe 41 or to flow towards the feeding pipe 42. The feeding pipe 42 includes a switch valve 421. When the switch valve 411 of the connecting pipe 41 is closed and the switch valve 421 of the feeding pipe 42 is opened, the feeding pipe 42 can guide the fluid to pass through the filter 11 and enter the crude liquid chamber S1. The pipeline module 4 further includes a discharge pipe 43 intercommunicating with the connecting pipe 41 and the first treatment liquid chamber S21. The discharge pipe S43 may include a switch valve 431. Therefore, the fluid in the other treatment liquid chambers S2 (the second treatment liquid chamber S22, the third treatment liquid chamber S23, and the fourth treatment liquid chamber S24) can successively overflow into the first treatment liquid chamber S21 and can flow through the discharge pipe 43 into the connecting pipe 41 for discharge, rather than overflowing into the crude liquid chamber S1. Furthermore, the switch valve 431 can prevent the fluid in the connecting pipe 41 from flowing reversely into the first treatment liquid chamber S21.

The tank 1 may further include a manhole 15 on a tank wall portion facing the crude liquid chamber S1 and another manhole 15 on another tank wall portion facing the fourth treatment liquid chamber S24 to permit a person to access or see the interior space in the crude liquid chamber S1 or the fourth treatment liquid chamber S24. Furthermore, each manhole 15 can be closed by a manhole cover 16.

Each of the plurality of cyclones 2 may include at least one discharge port 21 and at least one return port 22. The discharge ports 21 of the plurality of cyclones 2 intercommunicate with the plurality of treatment liquid chambers S2, respectively, such that after the fluid entering the cyclone 2 is separated by cyclone, a fluid with a relatively larger specific gravity is thrown out and sinks under the action of gravitational force to enter an associated treatment liquid chamber S2, whereas a fluid with a relatively smaller specific gravity can flow through the return port 22 towards the upstream end 1a and enter the tank 1 for continuous circulation.

In this embodiment, each of the plurality of cyclones 2 may be installed in the tank 1 and located on top of an associated treatment liquid chamber S2, such that the discharge port 21 can extend into the associated treatment liquid chamber S2, permitting precise input of fluid, whereas the return port 22 is exposed to the outside of the tank 1 for easy pipeline connection. Namely, the pipeline module 4 may include a plurality of return pipes 44. An end of each return pipe 44 may be connected to the return port 22 of an associated cyclone 2. Another end of each return pipe 44 may extend upward to intercommunicate with an associated treatment liquid chamber S2 or the crude liquid chamber S1.

As a non-limiting example, this embodiment may include three cyclones 2. Likewise, for ease of explanation, the three cyclones 2 are called first cyclone 2a, second cyclone 2b, third cyclone 2c from the upstream end 1a towards the downstream end 1b in sequence. Namely, the first cyclone 2a is the cyclone 2 closest to the upstream end 1a, the second cyclone 2b is the second one from the upstream end 1a, and the third cyclone 2c is the cyclone 2 closest to the downstream end 1b.

The discharge port 21 of the first cyclone 2a is aligned with the second treatment liquid chamber S22. Furthermore, a three-way valve 441 is disposed on the return pipe 44 connected to the discharge port 22 of the first cyclone 2a, such that, by switching the three-way valve 441, the return fluid can be controlled to flow into the crude liquid chamber S1 or the first treatment liquid chamber S21. Furthermore, in this embodiment, the second cyclone 2b may include two discharge ports 21 and two return ports 22. The two discharge ports 21 may be aligned with the third treatment liquid chamber S23. Furthermore, the diameter of each of the two discharge ports 21 of the second cyclone 2b may be smaller than the diameter of the discharge port 21 of the first cyclone 2a. One of the two return ports 22 of the second cyclone 2b intercommunicates with the crude liquid chamber S1 via a return pipe 44, and another of the two return ports 22 intercommunicates with the second treatment liquid chamber S22 via another return pipe 44. Furthermore, the discharge port 21 of the third cycle 2c may be aligned with the fourth treatment liquid chamber S24. The diameter of the discharge port 21 of the third cyclone 2c may also be smaller than the diameter of the discharge port 21 of the first cyclone 2*a*. The return port 22 of the third cyclone 2*c* may intercommunicate with the second treatment liquid chamber S22 via a return pipe 44.

The plurality of pressurizing pumps 3 is used to pump the fluid in the crude liquid chamber S1 or the treatment liquid chambers S2. The number of the pressurizing pumps 3 is at least the same as that of the cyclones 2. In tis embodiment, the number of the pressurizing pumps 3 may be four, and for ease of explanation, the four pressurizing pumps 3 are called, from the upstream end 1*a* towards the downstream end 1*b* in sequence, a first pressurizing pump 3*a*, a second pressurizing pump 3*b*, a third pressurizing pump 3*c*, and a fourth pressurizing pump 3*d*.

The first pressurizing pump 3*a* may intercommunicate with the crude liquid chamber S1 via a suction pipe 45 of the pipeline module 4 and may intercommunicate with the first cyclone 2*a* via a delivery pipe 46 of the pipeline module 4. Thus, by operation of the first pressurizing pump 3*a*, the fluid in the crude liquid chamber S1 can be pumped to the first cyclone 2*a* for a first-stage cyclone separation treatment. Likewise, the second pressurizing pump 3*b* may intercommunicate with the second treatment liquid chamber S22 via another suction pipe 45 and may intercommunicate with the second cyclone 2*b* via another delivery pipe 46. Thus, by operation of the second pressurizing pump 3*b*, the fluid in the second treatment liquid chamber S22 can be pumped to the second cyclone 2*b* for a second-stage cyclone separation treatment. The third pressurizing pump 3*c* may intercommunicate with the third treatment liquid chamber S23 via a further suction pipe 45 and may intercommunicate with the third cyclone 2*c* via a further delivery pipe 46. Thus, by operation of the third pressurizing pump 3*c*, the fluid in the third treatment liquid chamber S23 can be pumped to the third cyclone 2*c* for a third-stage cyclone separation treatment. Preferably, each of the suction pipe 45 connected to the second pressurizing pump 3*b* and the suction pipe 45 connected to the third pressurizing pump 3*c* includes a switch valve 451 to control output.

Furthermore, since each partitioning board 13 has the overflow hole 131, when the first pressurizing pump 3*a* malfunctions, even if the fluid in the crude liquid chamber S1 cannot be pumped to the first cyclone 2*a*, the fluid in the crude liquid chamber S1 can overflow into the first treatment liquid chamber S21 when the fluid reaches the height of the overflow hole 131. Furthermore, by the design of the height difference of adjacent overflow holes 131, when the second pressurizing pump 3*b* and/or the third pressurizing pump 3*c* malfunctions and, thus, cannot pump the fluid towards the downstream end 1*b*, the fluid (which is not expectedly separated by cyclone) will not overflow towards the downstream end 1*b* but will successively overflow towards the upstream end 1*a* and finally overflows into the treatment liquid chamber S2 (the first treatment liquid chamber S21) closest to the crude liquid chamber S1 and then flows through the discharge port 43 into the connecting pipe 41 for discharge, rather than overflowing into the crude liquid chamber S1.

Preferably, the multi-stage circulating separation equipment D of this embodiment may further include a stirrer 5, a solid-liquid separator 6, and a liquid collecting tank 7. The stirrer 5 may be installed in the tank 1 to stir the fluid in the fourth treatment liquid chamber S24 for homogenization. The fourth pressurizing pump 3*d* may intercommunicate with the fourth treatment liquid chamber S24 via a suction pipe 45 of the pipeline module 4. Preferably, a switch valve 451 is disposed on the suction pipe 45 to control output. The fourth pressurizing pump 3*d* may intercommunicate with the solid-liquid separator 6 via a delivery pipe 46 of the pipeline module 4, and a non-return valve 461 may be disposed on the delivery pipe 46. By operation of the fourth pressurizing pump 3*d*, the fluid in the fourth treatment liquid chamber S24 is pumped into the solid-liquid separator 6 for dehydration to separate liquid from solid. As a non-limiting example, the solid-liquid separator 6 may be a product of NORITAKE CO., LIMITED). The solid matters (such as dirt, precious metal, concentrated valuable minerals, or concentrated purified substances, etc.) after solid-liquid separation can be scraped by a scrapper in the solid-liquid separator 6 and can fall from the bottom of the solid-liquid separator 6. The solid-liquid separator 6 may use a liquid delivery pipe 47 to deliver a liquid obtained after solid-liquid separation into the liquid collecting tank 7 in a normal pressure state. The liquid collecting tank 7 may include a sensor 71 in electrical connection with the controller and can be used to detect the level in the liquid collecting tank 7. Furthermore, the liquid collecting tank 7 may use a return pipe 44 of the pipeline module 4 to intercommunicate with the third treatment liquid chamber S23, and a switch valve 442 may be disposed on the return pipe 44.

Figure 5:
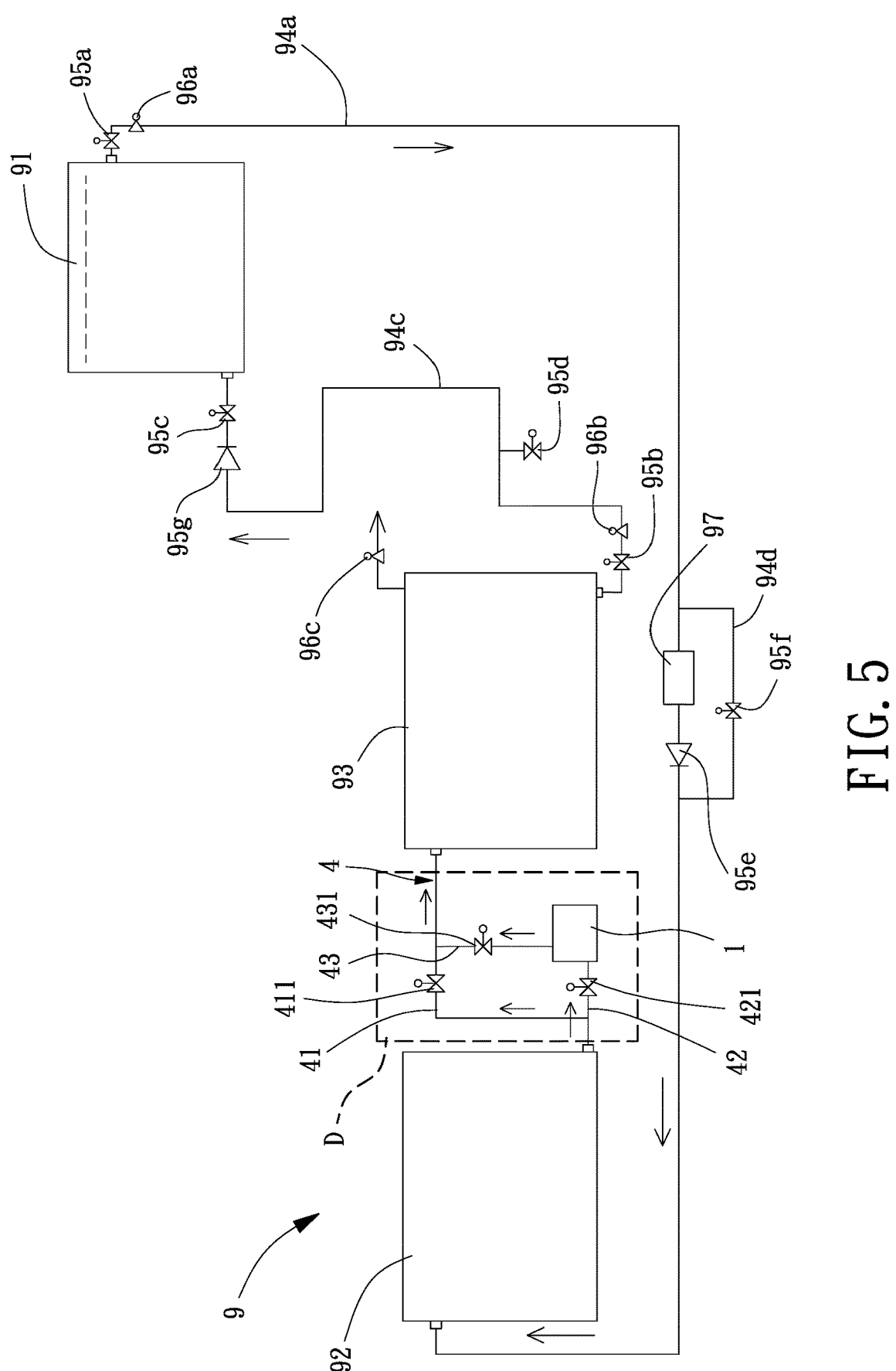
FIG. 5 is a diagram illustrating the multi-stage circulating separation equipment according to at least one embodiment of the present disclosure cooperating with a conventional machinery equipment.

With reference to FIG. 5, the multi-stage circulating separation equipment D (in the rectangle represented by dash lines) of this embodiment may be cooperated with and connected in series with the above conventional machinery equipment 9. Namely, the upstream end 1*a* of the tank 1 of the multi-stage circulating separation equipment D faces the to-be-treated oil tank 92, and the downstream end 1*b* of the tank 1 faces the circulating temporary oil storage tank 93. Furthermore, the input end of the connecting pipe 41 intercommunicates with the to-be-treated oil tank 92, and the output end of the connecting pipe 41 intercommunicates with the circulating temporary oil storage tank 93. The air in the circulating temporary oil storage tank 93 is sucked by the vacuum pump 96*c* to maintain a negative pressure state, such that the output end of the connecting pipe 41 can deliver the fluid towards the circulating temporary oil storage tank 93. After the oil sludge in the to-be-treated oil tank 92 is treated by the multi-stage circulating separation equipment D of this embodiment, the solid substances in the oil sludge can be reliably separated, and the liquid substances can flow into the circulating temporary oil storage tank 93.

Specifically, with reference to FIGS. 3 and 5, in the beginning of the cleaning operation of oil sludge in the to-be-treated oil tank 92, the switch valve 411 of the connecting pipe 41 is firstly closed, such that the oil sludge inputted into the connecting pipe 41 flows towards the feeding pipe 42, rather than flowing towards the output end of the connecting pipe 41. The switch valves 421, 431, 95*a*, 95*b*, and 95*c* are also opened, and the switch valve 95*f* is closed, such that the light oil at the upper portion of the crude oil tank 91 can be pumped out by the first pump 96*a* to serve as a laundry detergent carrier. The laundry detergent carrier flows through the delivery pipe 94*a*, the heater 97 and the non-return valve 95*e* and is heated to about 60° C. to dissolve the oil sludge in the to-be-treated oil tank 92 and to reduce the viscosity of the oil sludge, such that the oil sludge can be easily moved out of the to-be-treated oil tank 92 by the laundry detergent carrier. In an embodiment not requiring heating of the laundry detergent carrier, the switch valve 95*f* is opened, such that the laundry detergent carrier can bypass the heater 97 and flow through the delivery pipe 94*d* so as to be directly inputted into the to-be-treated oil tank 92.

After the fluid (hereinafter "crude liquid"), which is a mixture of the oil sludge and the laundry detergent carrier, is delivered out of the to-be-treated oil tank 92, the crude liquid flows through the input end of the connecting pipe 41 and passes through the feeding pipe 42 and the filter 11 into the crude liquid chamber S1 of the tank 1. Then, the first pressurizing pump 3a is used to pump the fluid, the crude liquid, and a first-stage clarified liquid (which will be explained in the next paragraph) in the crude liquid chamber S1 to the first cyclone 2a for proceeding with a first-stage separation treatment. Therefore, the fluid with a relatively larger specific gravity in the first cyclone 2a sinks to a position below the fluid with a relatively smaller specific gravity, and the fluid with a relatively larger specific gravity (which is about 25% of the crude liquid, depending on the discharge port 21 of the first cyclone 2a) can flow through the discharge port 21 of the first cyclone 2a into the second treatment liquid chamber S22.

On the other hand, since the fluid with a relatively smaller specific gravity (which is about 75% of the crude liquid) in the first cyclone 2a has undergone separation treatment by the first cyclone 2a, the fluid has a specific gravity lower than the crude liquid and has fewer impurities and is, thus, called "first-stage clarified liquid". The first-stage clarified liquid flows through the return pipe 44 connected to the first cyclone 2a and is discharged to the three-way valve 441. When the sensor 14 detects that the level in the crude liquid chamber S1 is not high enough (the feeding of the crude liquid is insufficient), the three-way valve 441 can permit the first-stage clarified liquid to flow back into the crude liquid chamber S1 to serve as a supplement of the laundry detergent carrier of the crude liquid chamber S1. On the other hand, when the sensor 14 detects that the level in the crude liquid chamber S1 is high enough, the three-way valve 441 permits the first-stage clarified liquid to flow into the first treatment liquid chamber S21 and then flow through the discharge pipe 43 into the connecting pipe 41, and the first-stage clarified liquid can be discharged via the output end of the connecting pipe 41.

Then, the second pressuring pump 3b is used to pump the fluid in the second treatment liquid chamber S22, the crude liquid which has undergone the first-stage separation but still has a portion of the oil sludge, a supplementary second-stage clarified liquid (which will be described below), and a supplementary third-stage clarified liquid (which will be described in the next paragraph) to the second cyclone 2b for a second-stage separation treatment. The fluid with a relatively larger specific gravity in the second cyclone 2b sinks to a position below the fluid with a relatively smaller specific gravity. Furthermore, the fluid with a relatively larger specific gravity (which is about 20% of the above mixture, because the diameters of the two discharge ports 21 of the second cyclone 2b is smaller than the diameter of the discharge port 21 of the first cyclone 2a) can flow through the two discharge ports 21 of the second cyclone 2b into the third treatment liquid chamber S23. Since the fluid with a relatively smaller specific gravity (which is about 80% of the above mixture) has undergone the separation treatment by the second cyclone 2b, the fluid has a specific gravity lower than the first-stage clarified liquid and has fewer impurities and is, thus, called "second-stage clarified liquid". Furthermore, a portion of the second-stage clarified liquid flows back into the second treatment liquid chamber S22 to serve as a supplement of the laundry detergent carrier of the second treatment liquid chamber S22. Another portion of the second stage clarified liquid flows back into the crude liquid chamber S1 to serve as a supplement of the laundry detergent carrier of the crude liquid chamber S1.

Next, the third pressuring pump 3c is used to pump the fluid in the third treatment liquid chamber S23, the crude liquid which has undergone the first-stage separation and the second-stage separation but still has a portion of the oil sludge, a supplementary fourth-stage clarified liquid (which will be described in the next paragraph) to the third cyclone 2c of a smaller diameter for a third-stage separation treatment. The fluid with a relatively larger specific gravity in the third cyclone 2c sinks to a position below the fluid with a relatively smaller specific gravity. Furthermore, the fluid with a relatively larger specific gravity (depending on the discharge port 21 of the third cyclone 2c, which is about 20% of the above mixture, because the diameter of the discharge port 21 of the third cyclone 2c corresponds to the diameter of each of the two discharge ports 21 of the second cyclone 2b) can flow through the discharge port 21 of the third cyclone 2c into the fourth treatment liquid chamber S24. Since the fluid with a relatively smaller specific gravity (which is about 80% of the above mixture that has undergone the $1^{st}$-$3^{rd}$ stage separation treatments) undergone the separation treatment by the third cyclone 2c, the fluid has a specific gravity lower than the second-stage clarified liquid and has fewer impurities and is, thus, called "third-stage clarified liquid". Furthermore, the third stage clarified liquid can flows back into the second treatment liquid chamber S22 to serve as a supplement of the laundry detergent carrier of the second treatment liquid chamber S22.

Then, the fourth pressuring pump 3d is used to pump the fluid in the fourth treatment liquid chamber S24 to the solid-liquid separator 6 to proceed with a fourth-stage separation treatment, such that the solid matters are separated from liquid. The solid matters (dirt) after separation fall from the bottom of the solid-liquid separator 6, and the liquid after separation is the above-mentioned fourth stage clarified liquid. Next, the liquid delivery pipe 47 delivers the fourth stage clarified liquid to the liquid collection tank 7. In a normal state, the fourth stage clarified liquid in the liquid collection tank 7 can flow through the return pipe 44 back to the third treatment liquid chamber S23 to serve as a supplement of the laundry detergent carrier of the third treatment liquid chamber S23. When the sensor 71 detects that the level in the liquid collection tank 7 is not high enough, the switch valve 442 on the return pipe 44 is closed to temporarily stop the fourth stage clarified liquid from flowing into the third treatment liquid chamber S23.

After each stage of separation treatment, the solid substances in the to-be-treated oil tank 92 can be separated and can be collected by the solid-liquid separator 6 or temporarily stored in the fourth treatment liquid chamber S24 (in an embodiment without the solid-liquid separator 6). The $1^{st}$-$4^{th}$ stage clarified liquids can flow into the first treatment liquid chamber S21 and then flow through the discharge pipe 43 to the output end of the connecting pipe 41, thereby flowing into the circulating temporary oil storage tank 93. Furthermore, the clarified liquid in the circulating temporary oil storage tank 93 is pumped by the second pump 96b to flow through the delivery pipe 94c, the non-return valve 95g, and the switch valve 95c and enter the crude oil tank 91 for storage and subsequent refinement. After many times of repeated circulation, the inspection valve 95d can be used to confirm whether the oil sludge in the to-be-treated oil tank 92 is completely removed.

In summary, when applying the multi-stage circulating separation equipment according to the present disclosure in the cleaning operation in which no person enters the oil tank, since solid substances in the oil sludge in the to-be-treated oil tank 92 can be separated, the solid substances in the oil sludge will not be carried back into the crude oil tank 91, avoiding accumulation of the oil sludge. Furthermore, since the multi-stage circulating separation equipment according to the present disclosure uses multi-stage separations in which the clean clarified liquid with a relatively smaller specific gravity is used as the supplement of the laundry detergent carrier, the pipeline module 4 and the plurality of pressurizing pumps 3 are less likely to be damaged or malfunction after long-term circulating delivery of the crude liquid with suspended impurities while avoiding adverse influence on the work period and poor quality control caused by the suspended impurities.

Furthermore, the above treatment operations are carried out in the interior of the multi-stage circulating separation equipment according to the present disclosure without the risks of dissipation of the to-be-treated objects and pollution to the environment, which is safer to the operator and work. Furthermore, the multi-stage circulating separation equipment has a simple structure which is helpful in reducing the equipment costs, and the volume is small while permitting continuous circulating treatment of a large amount of oil sludge, which is very ideal.

Particularly, in addition to the cleaning the oil sludge in the oil tank (no person enters the oil tank), the multi-stage circulating separation equipment according to the present disclosure can be used for separation treatment of recycling precious metal from waste materials, separation treatment of ores of a mine, separation of impurities from a mixture to increase the purity (purification treatment in chemical refining). The applications are relatively wide. Furthermore, since the controller and other detection gauges and micro switches electrically connected to the controller are in the field of ordinary skill and are, therefore, not described in detail, which can be appreciated by one having ordinary skill in the art.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims.

What is claimed is:

1. A multi-stage circulating separation equipment comprising:

a tank including an upstream end and a downstream end, wherein the tank includes an interior divided by a plurality of partitioning boards into a crude liquid chamber and a plurality of treatment liquid chambers, wherein the crude liquid chamber and the plurality of treatment liquid chambers are arranged from the upstream end towards the downstream end;

a plurality of cyclones each including at least one discharge port and at least one return port, wherein the discharge ports of the plurality of cyclones intercommunicate with the plurality of treatment liquid chambers, wherein the plurality of treatment liquid chambers includes, from the upstream end towards the downstream end in sequence, a first treatment liquid chamber, a second treatment liquid chamber, a third treatment liquid chamber, and a fourth treatment liquid chamber, and wherein the plurality of cyclones includes a first cyclone whose discharge port is aligned with the second treatment liquid chamber, a second cyclone whose discharge port is aligned with the third treatment liquid chamber, and a third cyclone whose discharge port is aligned with the fourth treatment liquid chamber;

a plurality of pressurizing pumps; and a pipeline module connected to the tank, the plurality of cyclones, and the plurality of pressurizing pumps, wherein a respective pressurizing pump closer to the upstream end pumps a fluid in the tank into an associated cyclone to urge a fluid with a relatively larger specific gravity to flow through the discharge port of the associated cyclone into an associated treatment liquid chamber, and the fluid with the relatively larger specific gravity is pumped by a next pressurizing pump to a next cyclone, thereby successively delivering the fluid with the relatively larger specific gravity towards the downstream end, and wherein a fluid with a relatively smaller specific gravity flows through the return port of the associated cyclone towards the upstream end and into the tank for continuous circulation.

2. The multi-stage circulating separation equipment as claimed in claim 1, wherein each partitioning board includes an overflow hole, and wherein the overflow hole of one of each two adjacent partitioning boards closer to the downstream end is higher than the overflow hole of another of the two adjacent partitioning boards closer to the upstream end.

3. The multi-stage circulating separation equipment as claimed in claim 1, wherein the pipeline module includes a feeding pipe intercommunicating with a connecting pipe and the crude liquid chamber, and wherein the pipeline module further includes a discharge pipe intercommunicating with the connecting pipe and the first treatment liquid chamber.

4. The multi-stage circulating separation equipment as claimed in claim 1, wherein the return port of the first cyclone is connected to a return pipe, and wherein a three-way valve is disposed on the return pipe to control the return fluid to flow into the crude liquid chamber or the first treatment liquid chamber.

5. The multi-stage circulating separation equipment as claimed in claim 1, wherein the second cyclone includes two return ports, wherein one of the two return ports intercommunicates with the crude liquid chamber via a return pipe, and wherein another of the two return ports intercommunicates with the second treatment liquid chamber via another return pipe.

6. The multi-stage circulating separation equipment as claimed in claim 1, wherein the return port of the third cyclone intercommunicates with the second treatment liquid chamber via a return pipe.

7. The multi-stage circulating separation equipment as claimed in claim 1, wherein the plurality of pressurizing pumps includes a first pressurizing pump intercommunicating with the crude liquid chamber via a suction pipe and intercommunicating with the first cyclone via a delivery pipe, a second pressurizing pump intercommunicating with the second treatment liquid chamber via another suction pipe and intercommunicating with the second cyclone via another delivery pipe, and a third pressurizing pump intercommunicating with the third treatment liquid chamber via a further suction pipe and intercommunicating with the third cyclone via a further delivery pipe.

8. The multi-stage circulating separation equipment as claimed in claim 1, further comprising a solid-liquid separator, wherein one of the plurality of pressurizing pumps intercommunicates with one of the plurality of treatment liquid chambers closest to the downstream end via a suction pipe, and wherein the one of the plurality of pressurizing pumps intercommunicates with the solid-liquid separator via a delivery pipe.

9. The multi-stage circulating separation equipment as claimed in claim 8, further comprising a liquid collecting tank, wherein the solid-liquid separator delivers a liquid obtained after solid-liquid separation into the liquid collecting tank via a liquid delivery pipe, and wherein the liquid collecting tank intercommunicates with the third treatment liquid chamber via a return pipe.

\* \* \* \* \*